United States Patent [19]

Anderson et al.

[11] Patent Number: 5,001,173

[45] Date of Patent: Mar. 19, 1991

[54] AQUEOUS EPOXY RESIN COMPOSITIONS AND METAL SUBSTRATES COATED THEREWITH

[75] Inventors: Karl P. Anderson, Columbus, Ohio; Whaite M. Clark, Rancho Mirage, Calif.; Poli C. Yu, Wexford, Pa.; Richard T. Moyle, Pataskala, Ohio

[73] Assignee: Morton Coatings, Inc., Chicago, Ill.

[21] Appl. No.: 165,529

[22] Filed: Mar. 8, 1988

Related U.S. Application Data

[63] Continuation-in-part of Ser. No. 48,281, May 11, 1987, abandoned.

[51] Int. Cl.$^5$ .................................................. C08K 3/22
[52] U.S. Cl. ..................................... 523/406; 523/402; 523/412; 523/451; 523/458; 523/459; 428/416; 428/418
[58] Field of Search ............... 523/402, 409, 451, 458, 523/406

[56] References Cited

U.S. PATENT DOCUMENTS

| | | | |
|---|---|---|---|
| 2,623,033 | 12/1952 | Snyder | 260/75 |
| 2,892,747 | 6/1959 | Dye | 154/43 |
| 3,262,903 | 7/1966 | Robertson | 523/458 |
| 3,382,081 | 5/1968 | Cutter et al. | 106/14 |
| 3,563,811 | 2/1971 | de Ritter et al. | 148/6.2 |
| 3,687,739 | 8/1972 | Kennedy et al. | 148/6.2 |
| 3,708,350 | 1/1973 | Kennedy et al. | 148/6.2 |
| 3,713,904 | 1/1973 | Bernath et al. | 148/6.16 |
| 3,874,921 | 4/1975 | Todd | 428/418 |
| 3,990,920 | 11/1976 | de Ridder et al. | 148/6.2 |
| 4,026,710 | 5/1977 | Kennedy | 106/1 |
| 4,309,183 | 12/1981 | William | 523/402 |
| 4,352,899 | 10/1982 | Tada et al. | 523/451 |
| 4,381,334 | 4/1983 | Balk et al. | 428/332 |
| 4,425,451 | 1/1984 | Sekmakas et al. | 523/414 |
| 4,461,857 | 7/1984 | Sekmakas et al. | 523/414 |
| 4,476,260 | 10/1984 | Salensky | 523/402 |
| 4,544,686 | 10/1985 | Bromley et al. | 523/411 |
| 4,554,213 | 11/1985 | Marini et al. | 428/418 |
| 4,598,109 | 7/1986 | Sekmakas et al. | 523/414 |

FOREIGN PATENT DOCUMENTS

| | | |
|---|---|---|
| 580037 | 9/1985 | Australia . |
| 273408 | 12/1987 | European Pat. Off. . |
| 49-36734 | 4/1974 | Japan . |
| 763471 | 6/1977 | Japan . |
| 109260 | 8/1981 | Japan . |
| 12860 | 1/1982 | Japan . |
| 221286 | 12/1983 | Japan . |
| 59-035934A | 2/1984 | Japan . |
| 59-052645A | 3/1984 | Japan . |
| 52646 | 3/1984 | Japan .................................. 428/418 |
| 537105 | 11/1984 | U.S.S.R. .............................. 523/458 |

*Primary Examiner*—John C. Bleutge
*Assistant Examiner*—David W. Woodward
*Attorney, Agent, or Firm*—Renner, Otto, Boisselle & Sklar

[57] ABSTRACT

This invention relates to aqueous epoxy resin-containing compositions and to such compositions which are particularly useful for depositing coatings on metallic substrates in order to protect substrates against corrosion. The aqueous compositions generally comprise (A) an organic resin component consisting essentially of at least one water-dispersible or emulsifiable epoxy resin or a mixture of resins containing more than 50% by weight of at least one water-dispersible or emulsifiable epoxy resin, (B) chromium trioxide, and (C) water, said composition further characterized as being substantially free of strontium chromate. The aqueous compositions may also contain other ingredients including zinc and/or ferro alloys.

These aqueous compositions are useful as pretreatment coatings on metal surfaces, and in particular, on steel and on galvanized and aluminized metal substrates. This pretreatment coating can then be coated with weldable or non-weldable primer coatings followed by the application of decorative topcoats such as appliance topcoats or automotive topcoats. The invention also relates to metal substrates which have been coated with the pretreatment coating and, optionally, the weldable or non-weldable primer coatings.

35 Claims, No Drawings

AQUEOUS EPOXY RESIN COMPOSITIONS AND METAL SUBSTRATES COATED THEREWITH

CROSS-REFERENCE TO RELATED APPLICATION

This application is a continuation-in-part of pending application Ser. No. 048,281, filed on May 11, 1987, now abandoned. The specification and claims of this earlier filed pending application are hereby incorporation in this application.

TECHNICAL FIELD

This invention relates to aqueous epoxy resin-containing compositions and to such compositions which are particularly useful for depositing coatings on metallic substrates in order to protect the substrates against corrosion. The aqueous epoxy resin-containing compositions can be modified to render the compositions weldable. The invention also relates to liquid coating compositions containing thermoplastic resins which are useful particularly as coating compositions applied over metal substrates which have been previously coated with the aqueous epoxy resin-containing compositions of the invention. The invention also relates to metal substrates which are coated with one or more of the resin-containing compositions of the present invention.

BACKGROUND OF THE INVENTION

Various types of liquid coating compositions have been applied to metallic substrates and baked thereon in order to protect the substrates against corrosion. Certain of such coatings are applied in conventional metal coil coating processes, and they must be sufficiently adherent and flexible to resist cracking, chipping and peeling. One process which has been utilized for improving the corrosion-resistance of various metal substrates generally involves the application of two coatings. The first coating is comprised of a material such as xanthan gum as carrier for the other ingredients of the coating which include a chromium compound such as chromium trioxide and zinc dust. On baking, the xanthan gum contained in the coating becomes water-insoluble. Generally, baked temperatures of at least about 500° F. are required. Over this baked coating is applied a second coating which comprises a zinc rich resin. U.S. Pat. No. 4,026,710 (Kennedy) describes such two-step procedures for improving the corrosion-resistance of metal.

U.S. Pat. No. 3,713,904 (Bernath et al) describes compositions and methods for producing corrosion-resistant and protective coatings on aluminum and aluminum alloys. The coating on the metal substrate comprises an organic resin, an inorganic hexavalent chromium compound, an oxidizable component, phosphoric acid and strontium chromate. On mixing, the strontium chromate and oxidizable component react to reduce the hexavalent chromium to trivalent chromium. The mixture is applied to the substrate which is then heated at an atmosphere of from about 600° F. to about 800° F. to achieve a metal temperature of at least about 450° F. which results in the oxidation of a portion of trivalent chromium to hexavalent chromium resulting in a strongly adherent organic resin coating. The organic resins described include epoxy resins. The patentees also describe the application of various top coats including vinyl top coats and finish coats comprising strontium chromate--potassium dichromate containing fluorocarbon finish coats.

U.S. Pat. No. 4,352,899 (Tada et al) describes a coating composition for metal substrates which comprises an epoxy resin, an organic phosphorus compound, zinc powder, and a magnesium compound dispersed in a liquid medium. A portion of the zinc powder can be replaced by a solid electroconductive material. Compositions are applied in organic solvents, and the compositions may contain various pigments including chromate pigments.

U.S. Pat. No. 4,381,334 (Balk et al) describes zinc-rich electrostatic powders comprising zinc incorporated into an epoxy resin powder. A variety of solid epoxy resins are described as being useful. The compositions may also contain a curing agent and other additives such as flow modifiers.

U.S. Pat. No. 4,461,857 (Sekmakas et al) describes thermosetting aqueous coating compositions having improved properties when the coating compositions are modified to include a water-dispersible epoxy phosphate. The epoxy phosphate-solvent mixtures are described in U.S. Pat. No. 4,598,109.

Zinc-rich coatings useful for improving corrosion-resistance are described in U.S. Pat. No. 4,476,260 (Salensky). The coatings comprise a mixture of zinc pigment, thermoplastic epoxy resins, an organosilane and optionally aluminum trihydrate and one or more dispersing agents. A washcoat composition suitable for application to tin-plated mild steel is described in U.S. Pat. No. 4,544,686 (Bromley et al), and the composition consists of an aqueous carrier medium and a binder comprising a thermosetting acrylic polymer, an epoxy resin, an acid catalyst which may be phosphoric acid or chromic acid or an ammonium or amine salt thereof. Epoxy resin-containing coatings also are described in U.S. Pat. No. 4,544,213, (Marini et al) where the patentees describe coatings of a mixture of phosphates and resins. The resins may be acrylic base resins, ethylene-vinyl acetate copolymer resins, or thermosetting epoxy resins.

Based upon English language abstracts of Japanese Patent Applications Nos. 59052645A and 59035934A, these patents describe a weldable coated steel sheet which has been obtained by applying a first coating comprising chromium trioxide, about 50% of which has been reduced to the trivalent state, phosphoric acid, polyacrylic acid, and acrylic emulsion in water. The coated metal is then roll-coated with zinc-manganese rich coatings which contain resin such as epoxy resins. The coating then is baked at about 260° C. for one minute.

Japanese Patent Application No. 4936734 describes coating a metal sheet with a corrosion-inhibiting agent of an epoxy-polyamide resin diluted in an organic solvent and mixed with phosphoric acid and chromium phosphate. The coating deposited by this solution is then top-coated with a mixture of Portland cement, and ethylene-vinyl acetate copolymer in water.

SUMMARY OF THE INVENTION

This invention relates to aqueous epoxy resin-containing compositions and to such compositions which are particularly useful for depositing coatings on metallic substrates in order to protect the substrates against corrosion. The aqueous compositions generally comprise (A) an organic resin component consisting essentially of at least one water-dispersible or emulsifiable epoxy resin or a mixture of resins containing more than 50% by weight of at least one water-dispersible or emulsifiable epoxy resin, (B) chromium trioxide, and (C) water, said composition further characterized as being substantially free of strontium chromate.

These aqueous compositions are useful as pretreatment coatings on metal surfaces, and in particular, on steel and on galvanized and aluminized metal substrates. This pretreatment coating can then be coated with weldable or non-weldable primer coatings followed by the application of decorative top coats such as appliance top-coats or automotive top-coats. The invention also relates to metal substrates which have been coated with the pretreatment coating and, optionally, the weldable or non-weldable primer coatings.

DESCRIPTION OF THE PREFERRED EMBODIMENTS

In one embodiment, the aqueous compositions of the present invention comprise (A) an organic resin component consisting essentially of at least one water-dispersible or emulsifiable epoxy resin or a mixture of resins containing more than 50% by weight of at least one water-dispersible or emulsifiable epoxy resin, (B) chromium trioxide, and (C) water, said composition further characterized as being substantially free of strontium chromate. These aqueous compositions are useful particularly for depositing corrosion-resistant coatings directly on clean steel or to galvanized metal and aluminized metal. The aqueous composition, as well as the other coating compositions described more fully below are easily applied to metal coils.

Because the aqueous compositions of this invention which are useful for depositing pretreatment coatings (or basecoat) on metal surfaces are film-formers and have substantial amounts of epoxy resin therein, they can be applied to both sides of a metal coil, baked and then quenched. The coated coil is then ready to receive a primer coat or a topcoat on each side as it passes into the finished coil coating station. Alternatively, the basecoat coating can be used as the only coating on the coil. Since the basecoating composition can be quenched, it can be simultaneously applied to both sides of a moving coil strip in contrast to some commercially available basecoatings which remain water-soluble after their application to the coil and even after their initial baking. An example of such a commercial coating is the coating described in the Background of the Invention which utilizes xanthan gum as the carrier. The primer coating based on xanthan gum must be first topcoated and then finish baked before it becomes water-insoluble.

When zinc is incorporated into the aqueous compositions of this invention used for depositing the basecoat as will be described more fully below, the coating deposited on the metal substrate further protects the substrate against rusting, and the coating compositions of the present invention, therefore, reduce the need for additional corrosion-resistant coatings on top of the basecoat.

The organic resin component of the aqueous compositions of the present invention is based upon water-dispersible or emulsifiable epoxy resins. In one embodiment, the organic resin component will comprise a mixture of resins containing at least 50% by weight of at least one water-dispersible or emulsifiable epoxy resin. A wide variety of water-dispersible or emulsifiable epoxy resins can be utilized in the aqueous compositions of the present invention. Generally, the epoxy resins will have a molecular weight of from about 300 to about 100,000. More generally, the epoxy resins will have epoxide equivalent weight of from about 150 to about 10,000, and more particularly, an epoxide equivalent weight of from about 1000 to about 3000. In one embodiment, the epoxy resin is one which typically has a weight per epoxide unit of about 1550–2500.

The water-dispersible or emulsifiable epoxy resins used in this invention may be any one of a number of well known epoxy resins which are characterized by the presence therein of at least one epoxide group. As used in the specification and in the appended claims, the term "epoxy resin" is intended to describe the reaction products of the condensation reaction of an epihalohydrin and a hydroxy-containing compound or carboxylic acid. The epoxy resins may be of the ether or ester types although the ether type epoxy resins are preferred.

Examples of ester-type epoxy resins include polyglycidyl esters obtainable by reaction of a compound containing two or more carboxylic acid groups per molecule with epichlorohydrin or glycerol dichlorohydrin in the presence of an alkali. Such polyglycidyl esters may be derived from aliphatic polycarboxylic acids, e.g., succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Ether-type epoxy resins are obtained by reaction of a compound containing at least two free alcoholic hydroxyl and/or phenolic hydroxyl groups per molecule with an epihalohydrin under alkaline conditions, or in the alternative, in the presence of an acidic catalyst with subsequent treatment with an alkali. The products of such reactions instead of being single simple compounds are generally complex mixtures of glycidyl polyethers. Generally, however, the principal product may be represented by the Formula I

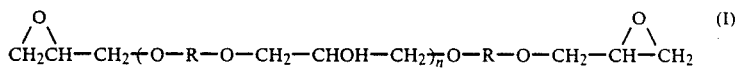

wherein n is an integer of from zero to 30 or more, and R represents the divalent hydrocarbon group of a polyhydroxy compound which may be an aliphatic or aromatic polyhydroxy compound. These ethers may be made from acyclic alcohols such as ethylene glycol, diethylene glycol, and higher poly(oxyethylene) glycols, propane-1,2-diol and poly(oxypropylene) glycols, propane-1,3-diol, poly(oxytetramethylene) glycols, pentane-1,5-diol, hexane-2,4,6-triol, glycerol, 1,1,1-trimethylolpropane, pentaerythritol, sorbitol, and polyepichlorohydrins; from cycloaliphatic alcohols such as resorcitol, quinitol, bis(4-hydroxycyclohexyl)methane, and 2,2-bis(4-hydroxycyclohexyl) propane, and from alcohols having aromatic nuclei, such as N,N-bis(2-hydroxyethyl)aniline and p,p'bis(2-hydroxyethylamino) diphenylmethane. Or they may be made from mononuclear phenols, such as resorcinol and hydroquinone, and from polynuclear phenols, such as bis(4-hydroxyphenyl) methane (otherwise known as bisphenol F), 4,4'-dihydroxydiphenyl, bis(4-hydroxyphenyl) sulphone, 1,1,2,2-tetrakis(4-hydroxyphenyl) ethane, 2,2-bis(4-hydroxyphenyl)propane, (otherwise known as bisphenol A), 2,2-bis(3,5-dibromo-4-hydroxyphenyl)propane, and novolacs formed from aldehydes such as formaldehyde, acetaldehyde, chloral, and furfuraldehyde, with phenol itself, and phenol substituted in the ring by chlorine atoms or by alkyl groups each containing up to 9 carbon atoms, such as 4-chlorophenol, 2-methylphenol, and 4-tert-butylphenol.

The value of n in Formula I is determined by the relative concentration of epichlorohydrin reactant to the polyhydroxy compound. The greater the concentration of epichlorohydrin, the lower the value of n. In general, the value of n determines many of the characteristics of the epoxy resin. For example, the resin generally is a liquid at room temperatures for values of n between 0 and about 3 and solid for values of n greater than about 3. The physical properties of the final hardened resin also are determined by the value of n since, as the value of n increases, the amount of cross-linking in the resin is increased resulting in a resin of greater strength and durability.

The epoxy resins have either a mixed aliphatic aromatic or an exclusively non-benzenoid (i.e., aliphatic or cycloaliphatic) molecular structure. The mixed aliphatic-aromatic epoxy resins generally are prepared by the well-known reaction of a bis-(hydroxy-aromatic) alkane or a tetrakis-(hydroxy-aromatic) alkane with a halogen-substituted aliphatic epoxide in the presence of a base such as, for example, sodium hydroxide or potassium hydroxide.

In one preferred embodiment, the epoxy resins are diglycidyl ethers of bisphenols, especially bisphenol A. These are made by reacting epichlorohydrin with bisphenol A in the presence of an alkaline catalyst. By controlling the operating conditions and varying the ratio of epichlorohydrin to bisphenol A, products of different molecular weight can be made.

Other usable epoxy resins include the diglycidyl ethers of other bisphenol compounds such as bisphenol B, F, G and H.

Epoxy resins of the type described above based on various bisphenols are available from a wide variety of commercial sources. One group is known by the general trade designation "Epon" resins and are available from Shell Chemical Company. For example, "Epon 820" is an epoxy resin having an average molecular weight of about 380 and is prepared from 2,2-bis-(p-hydroxyphenyl) propane and epichlorohydrin. Similarly, "Epon 1031" is an epoxy resin having an average molecular weight of about 616 and is prepared from epichlorohydrin and symmetrical tetrakis-(p-hydroxyphenol) ethane. "Epon 828" has a molecular weight of 350-400 and an epoxide equivalent of about 175-210. "Epon 1001" is an epoxy resin having an average molecular weight of about 1000 and an epoxide equivalent weight of 500. "Epon 1007" has an average molecular weight of about 4500 and an epoxy equivalency of about 2.0. "Epon 1009" has an epoxide equivalent of about 2400-4000.

Another group of commercially available epoxy resins is identified under the general trade designation EPI-REZ (Celanese Resins, a division of Celanese Coatings Company). For example, EPI-REZ 510 and EPI-REZ 509 are commercial grades of the diglycidyl ether or bisphenol A differing slightly in viscosity and epoxide equivalent. EPI-REZ 522F is a bisphenol A-epichlorohydrin resin with an epoxy equivalency of about 600.

Another class of epoxy resins useful in the present invention is the epoxidized novolacs, particularly the epoxy cresol and epoxy phenol novolacs. These are produced by reacting a novolac resin, usually formed by the reaction of orthocresol or phenol and formaldehyde with epichlorohydrin.

Epoxy resins derived from non-benzenoid materials such as aliphatic or cycloaliphatic hydroxy-containing compounds also can be utilized in the present invention. Epoxy resins having non-benzenoid molecular structures generally are referred to in the art as being aliphatic epoxy resins or cycloaliphatic epoxy resins. Cycloaliphatics can be produced by the peracetic epoxidation of cyclic olefins and by the condensation of an acid such as tetrahydrophthalic with epichlorohydrin, followed by dehydrohalogenation. The aliphatic epoxy resins can be prepared by reacting hydroxy-containing aliphatic and cycloaliphatic compounds such as aliphatic diols and triols. For example, ethylene glycol or glycerol can be reacted with a halogen-substituted aliphatic epoxide such as epichlorohydrin (and others mentioned above) to form liquid epoxy resins characterized by viscosities which are lower than epoxy resins derived from aromatic hydroxy compounds. When cured, such aliphatic epoxy resins are not as brittle as the aromatic epoxy resins, and in many instances, exhibit elastomeric properties. Aliphatic epoxy resins are available commercially from a variety of sources including, for example, Shell Chemical Company and Reichhold Chemicals, Inc. Specific examples include Epon 562 from Shell Chemical Company having a viscosity of 90-150 centipoises at about 23° C., an epoxide equivalent of 140-165, and a hydroxyl equivalent weight of about 65.

The epoxy resins will have an epoxy equivalency greater than 1.0. By epoxy equivalence, reference is made to the average number of 1,2-epoxide groups contained in the average molecule of the glycidyl ether or ester. As a result of the method of preparing the glycidyl polyethers and polyesters, and since they are ordinarily mixtures of chemical compounds having somewhat different molecular weights, the epoxy equivalency of the products is not necessarily the integer 2.0. However, the equivalency is generally a value of between 1.0 and 2.0. Epoxidized novolac resins which are useful in the present invention generally are prepared by the reaction of epichlorohydrin with phenol formaldehyde condensates. The epoxidized novolacs may contain more than two epoxy groups per molecule, and epoxidized novolacs having up to 7 to more epoxy groups are available commercially. The use of epoxidized novolacs containing more than two epoxy groups per molecule results in products containing a highly cross-linked structure.

Ultra-high molecular weight epoxy resins also may be used in the invention. A group of such resins is available from the Shell Chemical Company under the general trade designation "Eponol". The ultra-high molecular weight resins are derived from bisphenol-A and epichlorohydrin and the value of n in Formula I for Eponol Resin 53-BH-35 is about 90 whereas n is about 130 for the product identified as Eponol Resin 55-BH-30.

The organic resin component of the aqueous compositions of the present invention may comprise mixtures of epoxy resins with other water-dispersible or emulsifiable able resins which are effective for modifying the properties of the epoxy resins and/or the coatings which are deposited on metal substrates from the aqueous compositions. In one preferred embodiment, the resin component comprises a mixture of an epoxy resin and at least one halogen-containing thermoplastic polymer. Halogen-containing vinyl polymers and copolymers, including vinylidene chloride homopolymers and copolymers are useful in combination with the epoxy resins. Vinylidene chloride copolymers include copolymers of vinylidene chloride with vinyl chloride, acrylates or nitriles, the choice of comonomers being dependent upon the properties desired. Polyvinylidene fluoride resins useful in combination with the epoxy resins of the present invention are available commercially from a variety of sources including Pennwalt Corporation. One specific example of a polyvinylidene fluoride available from Pennwalt is Kynar 500 resin.

The resin component of the aqueous compositions of the present invention also may comprise mixtures of epoxy resins with other resins capable of modifying the properties of the epoxy resin such as amine-formaldehyde resins, phenol-formaldehyde resins, polyamide resins, urea resins, polyolefins, polyesters, etc. as long as the additional resins do not result in a substantial decrease of other desirable properties such as adhesion, corrosion-resistance, weldability, etc.

Among the polyesters which are useful in conjunction with epoxy resins in the aqueous compositions of the present invention are polyesters of aromatic dibasic acids and alkylene glycols. The polyesters also may be derived from a mixture of aromatic dicarboxylic acids containing at least some symmetrical aromatic dicarboxylic acid, one or more acyclic dicarboxylic acids, and one or more diols. Examples of symmetrical aromatic dicarboxylic acids include terephthalic acid, bibenzoic acid, ethylene bis-p-oxy benzoic acid, tetramethylene bis-p-oxy benzoic acid, and 2,6-naphthalic acid. Other aromatic dicarboxylic acids which can be used in conjunction with the symmetrical dicarboxylic acid include o-phthalic, isophthalic acid, etc.

The glycols which are reacted with the dibasic acids to form the desired linear polyesters are glycols represented by the formula

HO(Y)OH     (II)

wherein Y is an alkylene group containing from about 2 to about 10 carbon atoms. Examples of such glycols include ethylene glycol, 1,2- and 1,3-propanediol, 1,4-butanediol, neopentyl glycol, 1,6-hexanediol, polyethylene glycol, etc.

Representative of the acyclic dicarboxylic acids which can be incorporated into the polyesters are those characterized by the formula

HOOCCH$_2$XCH$_2$COOH     (III)

wherein X is a linear chain composed from 2 to about 8 atoms.

In one embodiment, mixtures of two or more acyclic dicarboxylic acids are utilized, and the acyclic dicarboxylic acids in the mixture will differ from each other by at least 3 carbon atoms in the linear chain. Specific examples of the acyclic dicarboxylic acids represented by the above Formula III include adipic acid, pimelic acid, suberic acid, azelaic acid, oxy-dibutyric acid, sebacic acid, 5-oxa-1,10-decanedioic acid, 4-n-propyl suberic acid, dodecane dioic acid, tridecane dioic acid, etc. Particularly useful combinations of aromatic and aliphatic dicarboxylic acids used in the preparation of copolyesters useful in the present invention include: terephthalic acid, azelaic acid and pentamethyleneglycol; terephthalic acid, isophthalic acid and adipic acid; terephthalic acid, isophthalic acid, adipic acid and sebacic acid; terephthalic acid, isophthalic acid, adipic acid and ethylene glycol; etc. Copolyesters of such mixtures can be prepared by known techniques, and they may be prepared directly from the above-identified dicarboxylic acids, or the copolyesters can be prepared from the lower alkyl esters of said dicarboxylic acids such as dimethyl terephthalate, dimethyl isophthalate, dimethyl sebacate, dimethyl adibate, etc. Procedures for preparing copolyesters useful in combination with the epoxy resins in this invention are described in, for example, U.S. Pat. Nos. 2,623,033 (Snyder) and 2,892,747 (Dye), both of which patents are hereby incorporated by reference for their disclosure of linear copolyesters derived at least in part from symmetrical aromatic dicarboxylic acids.

In one preferred embodiment, the polyesters which are utilized in combination with the epoxy resins are linear polyesters of aromatic dibasic acids and alkylene glycols. Generally, these polyesters are derived from a mixture of aromatic dibasic acids such as terephthalic and isophthalic acid with an alkylene glycol containing from 2 to about 6 or 8 carbon atoms in the alkylene group. Examples of such glycols include ethylene glycol, trimethylene glycol, 1,4-butylene glycol, etc. In addition to the aromatic dicarboxylic acids and the alkylene glycol, the reaction mixture also may, and preferably does contain, an acyclic dicarboxylic acid. The relative amounts of aromatic dicarboxylic acid and a cyclic dicarboxylic acid may be varied in order to obtain polyesters having different characteristics. In general, the ratio of equivalents of aromatic dicarboxylic acids to acyclic dicarboxylic acid will be from about 2:1 to about 1:2 and more generally about 1:1. The ratio of dicarboxylic acid to glycol also may be varied, and the glycol is generally present in excess amounts. Thus, ratios of dicarboxylic acids to diol generally are from about 1:1 to about 1:2.

The reaction between the dicarboxylic acid mixture and the diol generally is effected by heating the mixture to an elevated temperature in the presence of catalysts. Tin catalysts are especially useful for such purposes, and examples include dibutyl tin oxide and dibutyl tin dilaurate. Other catalysts which may be utilized include antimony oxide. The polyesters and copolyesters prepared in this manner generally will have molecular weights of from about 5000 to about 50,000 and will be further characterized as having hydroxyl numbers of between about 5 and 15.

The following are examples of polyesters which can be utilized in the compositions of the present invention. Unless otherwise indicated in the following examples, or elsewhere in the specification and claims, all parts and percentages are by weight, and all temperatures are in degrees centigrade.

POLYESTER EXAMPLE 1

Into a reaction vessel there is charged 387.6 parts (12.5 equivalents) of ethylene glycol, 228 parts (2.75 equivalents) of terephthalic acid, 117.6 parts (1.42 equivalents) of isophthalic acid, 396 parts (4.2 equivalents) of azelaic acid (Emerox 1144), and 0.42 part of antimony trioxide. An inert atmosphere is maintained and the mixture is heated to 240° C. with stirring while holding the vapor temperature below 125° C. A mixture of water and glycol (184 parts) is removed. When the batch temperature reaches 240° C., the reactor is adapted for vacuum processing and the pressure is reduced to about 25 mm. Hg. over 1.25 hours while raising the temperature to 250° C. The reaction is terminated 15 minutes after full vacuum is attained, and the vacuum is broken with nitrogen. The molecular weight of the polyester prepared in this manner is about 35,000, and the polyester is further characterized as having a hydroxyl number of about 8.9 and a hydroxy-to-carboxy ratio 1.06.

POLYESTER EXAMPLE 2

A reactor is charged with 17.08 parts of ethylene glycol, 35.31 parts of neopentyl glycol, 36.81 parts of isophthalic acid, 36.83 parts of terephthalic acid, 0.07 part of dibutyl tin octoate, and 0.13 part of triphenyl phosphite. The mixture is heated to 230° C. using an inert sparge. The exhaust temperature is maintained at or below 110° C. as the reaction mixture is heated to 230° C. The mixture then is maintained at 225°-230° C. until the acid number of the mixture is below 5. When the desired acid number is attained, the reactor is adapted for vacuum, and a vacuum of 3 mm. Hg. or less is maintained at a temperature of about 250° C. This temperature and vacuum level are maintained for a period of about 7.5 hours until the viscosity of the reactor contents is approximately L (at 40% in MEK). The reaction mixture then is cooled and recovered. The molecular weight of this polyester is about 17,500 and the polyester is characterized as having a hydroxyl number of about 8.

A second component in the aqueous compositions of the first embodiment of the present invention is hexavalent chromium in the form of chromium trioxide, chromic acid or chromic acid anhydride. The aqueous compositions generally will contain from about 0.5 to about 5% by weight of chromium trioxide.

In one embodiment, the aqueous compositions of the present invention will comprise (A) from about 2 to about 25% by weight of an organic resin component consisting essentially of at least one water-dispersible or emulsifiable epoxy resin or a mixture of resins containing more than 50% by weight of at least one water-dispersible or emulsifiable epoxy resin, (B) from about 0.5 to about 5% by weight of chromium trioxide, and (C) from about 25 to about 97% by weight of water, said composition further characterized as being substantially free of strontium chromate.

The aqueous composition of the first embodiment of the invention also may contain (D) phosphoric acid or an alkyl phosphoric acid. Examples of alkyl phosphoric acids include the lower alkyl phosphoric acids such as methyl phosphoric acid, ethyl phosphoric acid, propyl phosphoric acid, and butyl phosphoric acid. Generally, when the aqueous compositions of the present invention contain phosphoric acid or an alkyl phosphoric acid, only small amounts such as, for example, from about 0.1 to about 3% by weight of phosphoric acid or butyl phosphoric acid are included in the aqueous compositions, and this amount is sufficient to provide improved properties.

When the aqueous compositions of the first embodiment are to be utilized to deposit coatings on metal substrates, and it is desired that the coatings are weldable, the aqueous compositions of the first embodiment will also contain zinc powder which may be in the globular, powder, or flake form. Typically the zinc powder is distilled zinc dust or the powder is prepared by atomizing molten zinc in an air stream. The average particle size of zinc powder generally is from about 1 to about 15 microns, preferably from about 2 to about 6 microns. In the case of flaked zinc powder, the particle size (longer axis) may be from about 1 to about 15 microns, preferably from about 2 to about 10 microns. Mixtures of zinc powders having different shapes and particle sizes also may be utilized in the aqueous compositions. The amount of zinc powder included in the aqueous compositions of the present invention may be varied over a wide range, and generally, the zinc powder content of the aqueous compositions will be from about 5 to about 60% by weight of the total composition.

When the zinc powder is included in any of the aqueous compositions of the present invention to improve the weldability of the coating deposited on metal substrates by the aqueous compositions of the present invention, the aqueous composition also may contain, and preferably does contain, at least some ferro alloy powder which is effective to improve the weldability of the coating. Suitable refractory ferro alloy powders are known and these include ferromanganese, ferromolybdenum, ferrosilicon, ferrochlorine, ferrovanadium, ferroboron, ferrophosphorus, iron carbide, etc. The refractory alloys which are suitable are those which are electrically conductive, brittle, and essentially unreactive in water, dilute acids or dilute alkaline solutions. Of the various refractory alloys available, the preferred material is generally ferrophosphorus which is an iron phosphide composition generally containing a mixture of $Fe_2P$ and $FeP$. The ferrophosphorus can be used with or without zinc, and zinc can be used without the ferrophosphorus. Generally, however, mixtures appear to be beneficial, and mixture comprising zinc and from 1 to about 80 parts, more often 1 to 30 parts, per 100 parts of zinc are useful.

The aqueous compositions of the invention also may contain small amounts (e.g., 0.1 to 5% w) of organic solvents and water-compatible or organic lubricants. An example of a type of organic solvent which is useful are the dibasic acid esters and commercial mixtures of dibasic acid esters available from DuPont under the general trade designation "DBE". The compositions of the DBE materials and other useful organic solvents are discussed and illustrated elsewhere in this specification. Lubricants may be included to improve polymer flow and coating properties. Examples of lubricants which can be included in the aqueous compositions include glycerol esters, fatty acids, fatty acid esters, fatty acid amides, fatty acid salts, fatty alcohols, etc. Examples of such lubricants include: glycerol monostearate, calcium stearate, zinc stearate, polythylene waxes and silicone.

In a second embodiment, the aqueous compositions of the present invention comprise
(A) at least one water-dispersible or emulsifiable epoxy resin,
(B) chromium trioxide,
(C) water, and
(D) zinc powder and/or a ferro alloy.
The aqueous compositions of this second embodiment differ from the aqueous compositions of the first embodiment in that zinc powder and/or a ferro alloy is a required component, the aqueous composition may contain, in addition to the epoxy resin, other resins in large amounts such as to provide aqueous compositions containing mixtures of resins which may contain less than 50% by weight of epoxy resin. Furthermore, strontium chromate may be included in the aqueous compositions of the second embodiment.

In addition to the above four required components, the aqueous compositions of the second embodiment also may contain one or more of the following components: phosphoric acid or an alkyl phosphoric acid; at least one halogen-containing thermoplastic polymer; and/or at least one thermoplastic polyester resin. The epoxy resin, halogen-containing thermoplastic polymer, and thermoplastic polyester resin present in the aqueous compositions of the second embodiment may be any of the corresponding resins and polymers described for the aqueous composition of the first embodiment. Moreover, as in the first embodiment, the aqueous compositions of the second embodiment may contain di-iron phosphide in the amount of from about 1 to about 80% by weight based on the weight of zinc powder present in the composition. In one embodiment, the zinc may be entirely replaced by a ferro alloy. The amounts of the various components of the aqueous compositions of the second embodiment are the same as the amounts utilized for the same components in the aqueous compositions of the first embodiment.

In general, the aqueous compositions of the second embodiment will comprise
(A) from about 2 to about 25% by weight of at least one water-dispersible or emulsifiable epoxy resin characterized as having an epoxide equivalent of at least about 1000 to about 3000,
(B) from about 0.5 to about 5% by weight of chromium trioxide,
(C) from about 25 to about 90% by weight of water,
(D) from about 5 to about 60% by weight of zinc powder and/or ferro alloy, and
(E) from about 0.5 to about 3% by weight of phosphoric acid or butyl phosphoric acid.

The above compositions also may contain from about 0.5 to about 15% by weight of at least one fluorine-containing vinyl polymer and/or from about 0.5 to about 15% by weight of a thermoplastic polyester resin of the types previously described.

In another embodiment, the aqueous compositions are corrosion-resistant, water-borne liquid pretreating basecoat compositions for metallic substrates, said compositions comprising

| Constituents | Concentration (wt. %) |
| --- | --- |
| Water-dispersible epoxy resin | 2.1–18.4 |
| Chromium trioxide powder | 0.8–4.6 |
| Phosphoric acid | 0.8–2.7 |
| Zinc powder | 6.2–51.5 |
| Water | 29.2–88.0 | said composition having a bake temperature of about 390° F. to 450° F. to provide a flexible crack-resistant coating on steel and on galvanized and aluminized metal substrates.

The aqueous compositions of the present invention may be prepared by mixing the various components utilizing techniques well known to those skilled in the art. The order of mixing may be varied. In one embodiment, the chromium trioxide is dissolved in water and then the water dispersed epoxy is added followed by other ingredients. Mixing can be accomplished by conventional mixing procedures such as, for example, with the use of high speed agitation using a homo mixer or a dispersion mill. Mixers such as Brabender and Banbury mixers also can be utilized for preparing the aqueous compositions of the present invention.

The following examples illustrate the aqueous compositions of the present invention.

EXAMPLES 1–9

TABLE I

| | Aqueous Compositions Component (wt. %) | | | | |
| --- | --- | --- | --- | --- | --- |
| Example | Resin 3540[a] | $CrO_3$ | $H_3PO_4$[b] | Zn | Water |
| 1 | 9.5 | 2.5 | — | — | 88 |
| 2 | 9.5 | 2.5 | 1.0 | — | 87 |
| 3 | 11.7 | 1.5 | 0.8 | 6.2 | 79.8 |
| 4 | 5.0 | 2.5 | 1.0 | 8.0 | 83.5 |
| 5 | 2.5 | 2.5 | 1.0 | 8.0 | 86.0 |
| 6 | 3.3 | 3.3 | 1.5 | 10.0 | 81.9 |
| 7 | 17.0 | 1.5 | 0.8 | 51.5 | 29.2 |
| 8 | 5.6 | 0.5 | 2.7 | 17.2 | 74.0 |
| 9 | 11.7 | 1.5 | 0.8 | 6.2 | 79.8 |

[a]Bisphenol A type resin from Interez Inc.; 55% solids in water
[b]85% $H_3PO_4$ The utility of the aqueous compositions of the present invention as basecoats for metal substrates is illustrated in the following experiments. Cold rolled steel is coated with the aqueous compositions of Examples 1–9, and the coating is baked at 390° F. peak metal temperature to yield a dry coating weight of about 100 mg/ft². The corrosion-resistant characteristics of the coating composition deposited on the cold rolled steel is determined by subjecting coated steel panels to the ASTM Salt Spray Test ASTM B-117. In this test, a scratch (scribe) is made through the paint coating with a sharp instrument so as to expose the underlying metal. The scratched panel is then placed in a chamber at about 95° F. where it is contacted with a spray of 5% aqueous salt solution for up to 240 hours. (The test is terminated after 240 hours.) During the test, the panels are observed to determine the time of failure. A coated panel is considered to fail this test when it delaminates or shows evidence of blistering.

The adhesion and flexibility of the primer films on the metal substrate is determined for use of the Olsen Button Test utilizing a Tinius-Olsen testing machine with a ⅝-inch diameter ball and a 1-inch diameter die or equivalent. The Tinius-Olsen or equivalent machine is used to gradually form a reverse dome on the coated metal. A panel is inserted into the machine and secured over the forming ball. A wheel on the side of the machine is gradually rotated until an agreed-upon deformation is achieved. The forming ball is then retracted and the panel removed from the machine.

The formed area is tested for adhesion by taping the formed area with scotch tape an agreed-upon number of times, and the amount of coating removed by the scotch tape is compared to photographic standards and rated 1 through 8 with 8 being perfect or no coating removal.

The weldability of the coated steel panels also is determined by attempting to spot weld two panels together face-to-face and face-to-back. The panels were coated on one side only.

The results of the Salt Spray Test on base-coated panels containing a dome applied by the Olsen method, and the weldability test are summarized in the following Table II. The control coating is deposited from an aqueous composition consisting of 10 parts by weight of Resin 3540 and 90 parts of water.

TABLE II

Performance Results on Cold Rolled Steel

| Aqueous Coating Composition | Salt Spray Hrs. to Failure | | | Weldability | |
|---|---|---|---|---|---|
| | Scribe | Field | .03 Olson Button | Face-to Face | Face-to Back |
| Control | 3 | 3 | 3 | No | No |
| 1 | 10 | 10 | 10 | No | No |
| 2 | 10 | 10 | 10 | No | No |
| 3 | 240 | 240 | 72 | Yes | Yes |
| 4 | 240 | 240 | 72 | Yes | Yes |
| 5 | 240 | 240 | 72 | Yes | Yes |
| 6 | 240 | 240 | 120 | Yes | Yes |
| 7 | 240 | 240 | 240 | No | Yes |
| 8 | 72 | 72 | 72 | Yes | Yes |
| 9 | 240 | 240 | 240 | Yes | Yes |

The results summarized in the above Table II indicate the improved corrosion resistance obtained with the aqueous coating compositions of the present invention, and that in the absence of the zinc powder, the basecoat has poor weldability and has a lower resistance to salt water spray. Also, a lower chromium trioxide content (composition 9) results in somewhat lower resistance to salt spray. The rating of 240 hours for the Salt Spray Test is an indication that the coated panel did not fail the test since the test was terminated after 240 hours.

Additional examples of the aqueous compositions of the present invention are shown in Table III.

EXAMPLES 10-19

TABLE III

Aqueous Compositions

| Example | Type[a] | Resin 3540[b] | $CrO_3$ | $H_3PO_4{}^c$ |
|---|---|---|---|---|
| 10 | NW | 4.6 | 2.6 | — |
| 11 | W | 4.3 | 2.4 | 1.2 |
| 12 | NW | 28.0 | 3.0 | — |
| 13 | W | 22.5 | 2.4 | — |
| 14 | NW | 28.0 | 3.0 | — |
| 15 | W | 23.7 | 2.5 | — |
| 16 | NW | 28.0 | 3.0 | — |
| 17 | W | 23.7 | 2.5 | — |
| 18 | NW | 28.0 | 3.0 | — |
| 19 | W | 23.7 | 2.5 | — |

| Example | Zn | PVDF[d] | Polyester[e] | $Fe_2P$ | Water[f] |
|---|---|---|---|---|---|
| 10 | — | — | — | — | 92.8 |
| 11 | 7.6 | — | — | — | 84.5 |
| 12 | — | 1.7 | — | — | 67.3 |
| 13 | 13.0 | 1.4 | — | 1.6 | 54.1[g] |
| 14 | — | — | — | — | 63.0[h] |
| 15 | 13.5 | — | — | 1.7 | 53.4[i] |
| 16 | — | — | 6.0 | — | 63.0 |
| 17 | 13.5 | — | 5.2 | 1.7 | 53.4 |
| 18 | — | 1.7 | 6.0 | — | 61.3 |
| 19 | 13.5 | 1.4 | 5.1 | 1.7 | 52.1 |

[a]NW = non-weldable W = weldable
[b]55% solids in water
[c]85% in water
[d]KYNAR 500
[e]Polyester-1, 30% solids in DBE
[f]Can also contain small amounts of organic lubricants
[g]Composition also contains 5.0% of organic solvent Dibasic Esters (DBE) from DuPont
[h]Also contains 6.0% of DBE
[i]Also contains 5.2% of DBE The coating compositions of Examples 10-19, on a dry film basis, are summarized in the following Table IV.

TABLE IV

Coating Compositions-Dry Film Basis

| Example | Resin 3540 | $CrO_3$ | $H_3PO_4{}^c$ |
|---|---|---|---|
| 10 | 50 | 50 | — |
| 11 | 18.7 | 19.9 | 8.9 |
| 12 | 77.0 | 15.0 | — |
| 13 | 40.3 | 7.8 | — |
| 14 | 83.7 | 16.3 | — |
| 15 | 42.3 | 8.1 | — |
| 16 | 76.2 | 14.9 | — |
| 17 | 40.2 | 7.7 | — |
| 18 | 70.3 | 13.7 | — |
| 19 | 38.7 | 7.4 | — |

Components (wt. %)[a]

| Example | Zn | PVDF | Polyester | $Fe_2P$ |
|---|---|---|---|---|
| 10 | — | — | — | — |
| 11 | 54.5 | — | — | — |
| 12 | — | 8.0 | — | — |
| 13 | 42.1 | 4.6 | — | 5.2 |
| 14 | — | — | — | — |
| 15 | 44.1 | — | — | 5.5 |
| 16 | — | — | 8.9 | — |
| 17 | 41.8 | — | 5.0 | 5.3 |
| 18 | — | 7.8 | 8.2 | — |
| 19 | 40.2 | 4.2 | 4.5 | 5.0 |

[a]Coating also contains organic lubricant if included in aqueous coating composition.

As can be seen from the above discussion and data, the aqueous, epoxy resin-containing compositions of the present invention are useful for providing adherent, flexible, corrosion-resistant basecoats for metal substrates. The coatings are formable, and may be weldable, and the coatings may be easily applied utilizing known coil coating processes. The aqueous basecoat compositions of the present invention can be applied to a variety of metallic substrates such as cold rolled and hot rolled steel, aluminized steel, and on galvanized surfaces such as hot-dipped galvanized and electro-galvanized steel, galvalume, galvaneal, etc. The aqueous compositions of the present invention are relatively stable one-package systems but may be supplied as indefinitely stable two- and three-package systems providing excellent basecoat treatments to such metal substrates. The basecoats can be applied by known techniques including dipping, spraying, roller coating, bar coating, etc. After application of the aqueous coating composition to the metal substrate, the coating is dried and generally baked at an elevated temperature of from 200°-500° F., preferably between about 350°-450° F. The composition is generally applied to the metal substrates in sufficient amounts to provide a coating, on a dry basis of from 50-150 mg/ft² although heavier or lighter coatings may be applied.

Although the basecoats deposited on metal substrates by the aqueous epoxy resin-containing compositions of the present invention provide improved corrosion-resistance, it is generally desired to apply one or more additional coatings to the basecoat treated metal for various purposes including further corrosion-resistance, aesthetics, etc. In addition to providing corrosion-resistance and weldability properties to the metal substrates, the basecoat generally improves the adhesive bond between additional coatings and the metal substrate. In other words, the presence of the basecoat on the metal substrate improves topcoat adhesion.

The primer or topcoats which can be applied over the basecoat may be deposited from aqueous or solvent systems, and the primer and topcoats may or may not be weldable. Many commercially available primers and topcoat compositions are available and can be applied over the bascoat compositions of this invention.

In one embodiment, liquid coating compositions which are useful in particular as primer coatings over the basecoatings of the invention comprise
(A) at least one cross-linkable thermoplastic resin,
(B) at least one organic solvent,
(C) at least one flow control agent,
(D) at least one cross-linking agent for the thermoplastic resin.

Additionally, these coating compositions may optionally, and generally will contain one or more of the following components: suspending aids, pigments, other resins and polymers, corrosion-inhibitors, phosphoric acid or an alkylated phosphoric acid, adhesion promoters, etc., and zinc and/or ferro alloys if the coating is to be weldable.

A variety of cross-linkable thermoplastic resins can be utilized in the preparation of these coating compositions. In one embodiment, the cross-linkable thermoplastic resins are cross-linkable thermoplastic polyesters. Particularly useful in the coating compositions of the present invention are linear saturated polyester resins containing hydroxyl groups. The linear saturated polyester resins may be characterized by a hydroxy number of from about 5 to about 60 and more generally by a hydroxyl number of from about 5 to about 15. The molecular weight of the linear saturated polyester resins range from about 5000 to about 50,000 or more. Linear polyester resins having a hydroxyl number of from about 5 to about 15 and a molecular weight of from about 10,000 to about 20,000 are particularly useful in this invention. The linear polyesters generally may be derived from a mixture of aromatic dicarboxylic acids and a mixture of glycols. The aromatic dicarboxylic acids include terephthalic acid, bibenzoic acid, ethylene bis-p-oxy-benzoic acid, 2,6-naphthalic acid, orthophthalic acid, isophthalic acid, etc. Mixtures of terephthalic and isophthalic acids are particularly useful. The glycols which are used in the preparation of the linear polyesters may be characterized by the general formula

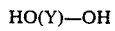
HO(Y)—OH wherein Y is a hydrocarbyl group containing from 2 to 10 carbon atoms. The diols preferably are selected from the group consisting of ethylene glycol, 1,2- and 1,3-propanediol, 1,4-butanediol, neopentyl glycol, 1,6-hexanediol, etc. A particularly useful mixture is a mixture of ethylene glycol and neopentyl glycol.

A particularly useful linear polyester containing hydroxyl groups is derived from a mixture of terephthalic acid, isophthalic acid, ethylene glycol and neopentyl glycol. The relative amounts of the four components may be varied over a wide range. For example, the polyester resin can be derived from mixtures comprising from about 20 to about 60 mole percent of terephthalic acid, from about 15 to about 50 mole percent of isophthalic acid, and from 10 to about 50 mole percent of the glycol mixture.

The polyesters used in the liquid coating compositions useful for depositing primer coatings include the other polyesters which are described above as being useful in combination with the epoxy resins in the aqueous coating compositions. Both of the specific polyesters identified as Polyester-1 and Polyester-2 also can be used in the primer coating composition.

The linear saturated polyester resins which are utilized in the preparation of the liquid coating compositions of this invention exhibit good adhesive strength, elasticity, scratch-resistance and impact resistance.

Polyesters which may be utilized in the primer coating compositions of the present invention also are available commercially. One such group of polyester resins are available from the Nobel Dynamit Company under the general trade designation Dynapol ®. These high molecular weight linear saturated polyesters are characterized as having a hydroxyl number of from about 5 to about 60 and molecular weights of from about 3000 to about 18,000. Specific examples include Dynapol L205 characterized as having a molecular weight of 15,000 and a hydroxyl number of 10; Dynapol L206 having a molecular weight of 18,000 and a hydroxyl number of 8; and Dynapol LH812 having a molecular weight of about 3000 and a hydroxyl number of 35.

The primer liquid coating compositions are dissolved or suspended in at least one organic solvent which may be an aliphatic organic solvent or an aromatic organic solvent of mixtures thereof. Most generally, the solvent system will comprise a mixture of aliphatic and aromatic solvents. Typically, the aromatic solvent will be characterized by a boiling point of from about 350° to 410° F. The useful aliphatic solvents include ketones such as methylethyl ketone, methylisobutyl ketone, acetone, isophorone, butyl carbitol, diacetone alcohol, lower alkyl ethers of various glycols and acetates, lower alkyl acetates, etc.

Particularly useful solvents are the solvents available from DuPont under the general trade designation DBE (dibasic esters). The DBE's are refined dimethyl esters of adipic, glutaric and succinic acids. They are available individually and as mixtures. For example, the product identified as DBE has an ester content of 99.5% minimum and the esters comprise from 10 to 25% by weight of dimethyl adipate, 55 to 75% by weight dimethyl glutarate, and 15 to 25% by weight dimethyl succinate. A typical DBE composition is reported to comprise 17% dimethyl adipate, 66% dimethyl glutarate, 16.5% dimethyl succinate and 0.2% methanol. Another dibasic ester mixture available from DuPont under the designation DBE-3 comprises 89% by weight dimethyl adipate, 10% by weight dimethyl glutarate, 0.5% by weight dimethyl succinate and less than 0.1% methanol. The use of the liquid DBE solvents also appears to improve the leveling characteristics of the coatings deposited from the liquid compositions.

The primer coating compositions of the present invention also contain at least one flow control agent. Various flow control agents generally used with resin coating compositions (e.g., paints) can be utilized, and many of these are resins such as acrylic flow-modifying resins commercially available from a variety of sources. The polyacrylic resins may be of the methyl-methacrylate type; ethylene vinyl acetate resins; etc.

The primer coating compositions useful in the present invention also contain at least one cross-linking agent for the cross-linkable thermoplastic resin. A variety of cross-linking materials may be utilized with the polyesters, and these include, for example, aminoplasts (amino resins), e.g., urea formaldehyde and melamine formaldehyde and their alkoxy derivatives, phenol formaldehyde resins, epoxy resins, isocyanates, etc. Examples of useful isocyanate cross-linking agents include toluene diisocyanate (TDI), 4,4′-methylene-bis(diphenyl) diisocyanate, a 2:1 molar adduct of toluene diisocyanate and diethylene glycol, 1,6-hexamethylene diisocyanate, adducts of toluene diisocyanate and trimethylol propane, etc. The polyisocyanates used as cross-linkers may be blocked with thermally unstable blocking agents such as phenols, alcohols, etc. The weight ratio of polyester/cross-linker in the compositions of the invention may be varied between about 95/5 to about 60/40 or even less. Melamine resins are also useful cross-linking agents for the polyesters. An example of such a cross-linking agent is hexamethoxy methyl melamine.

The primer coating compositions also may contain various suspending aids such as silica powder, silane treated silica, quaternary amine treated magnesium aluminum silicate (Bentone-NL Industries) etc. When included in the coating compositions, the suspending aid may be present in an amount of from about 0.1 to about 2% by weight.

Pigment powders also can be, and generally are included in the primer coating compositions of the invention. The choice of pigment will depend on the particular color or colors desired in the primer coating. The pigments may be organic pigments and/or inorganic pigments, although inorganic pigments are generally utilized. The amount of pigment incorporated into the primer coating compositions of the present invention will be from about zero to about 25% by weight of the total weight of the coating composition.

Carbon blacks are well known color pigments often utilized in black polymer formulations. Among the carbon blacks which may be utilized as color pigments in the present invention are furnace blacks, channel blacks, and lamp blacks. The pigment powder also may be metal powders, metal oxides and other inorganic compounds such as barium sulfate. Among the metallic oxides which can be utilized as pigments are zinc oxide, aluminum oxide, magnesium oxide, iron oxide red, iron oxide yellow, chrome oxide green and titanium oxide white. Other inorganic pigments which may be utilized to provide desired colors include zinc sulfide, cadmium sulfoselenide, cadmium mercury, zinc chromate, cobalt aluminate, chrome cobalt-alumina, ultra-marine blue and lead carbonate.

Corrosion-inhibitors also may be included in the primer coating compositions. The amount of corrosion-inhibitor may be varied from about zero to about 11% by weight. Strontium chromate powder is a particular example of a corrosion-inhibitor useful in the primer coating compositions of the present invention.

Adhesion promoters may be incorporated into the primer coating compositions in amounts up to 5% by weight. An example of a class of useful adhesion promoters are the epoxy phosphate esters. Epoxy phosphate esters generally are prepared by reacting an epoxy resin with phosphoric acid in an organic solvent. Other polymers or resins may be included to modify the composition and properties of the epoxy phosphate esters. In one process, a polyepoxide is added to a heated mixture of organic solvent and phosphoric acid while maintaining the mixture at an elevated temperature such as about 100° C. The epoxy resins which can be utilized in the process may be any polyepoxide having an epoxide equivalency in excess of 1. The epoxy resins described above as being useful in the aqueous compositions (basecoat formulations) are examples of epoxy resins which can be converted to phosphate esters and used in the primer compositions. Diglycidyl ethers of the various bis-phenols such as bis-phenol A having an average molecular weight in the range of 350-7000 are useful. The amount of phosphoric acid utilized should be sufficient to provide from about 0.03 to about 0.9 mole of the acid per epoxy equivalent in the polyepoxide.

The preparation of epoxy phosphate esters useful as adhesion promoters in the primer coating compositions is described in the prior art such as in U.S. Pat. Nos. 4,425,451; 4,461,857; and 4,598,109, and these patents are hereby incorporated by reference for their disclosures of methods for preparing epoxy phosphate esters as well as the epoxy phosphate esters described in these patents.

A specific example of the preparation of an epoxy phosphate ester useful in the primer coating compositions is as follows:

EPOXY PHOSPHATE ESTER EXAMPLE 1

A mixture of 291.6 parts of butyl Cellosolve, 50.4 parts of Xylol and 114 parts of methyl isobutyl ketone is prepared with agitation. An inert gas (carbon dioxide) is bubbled through the liquid, and 483.6 parts of Epon 1001 (diglycidyl ether of bis-phenol A having an average molecular weight of 1000 and an epoxide equivalent weight of 500, Shell Chemical) and 187.2 parts of RJ-101 copolymer, a styrene-allyl alcohol copolymer from Monsanto, are charged to the reactor while applying some heat to effect complete dissolution. The mixture is cooled to about 140° F. if necessary, and at a temperature between 100°-140° F., 73.2 parts of 85% phosphoric acid are added. This reaction is exothermic, and the temperature of the reaction is controlled by cooling if necessary to insure that the reaction temperature does not exceed 200° F. After about 0.5 hour, the reaction mixture is cooled and filtered. The filtrate is the desired epoxy phosphate ester containing about 64% nonvolatile materials.

In addition to the epoxy phosphate ester adhesion promoter, the primer coating compositions also may include a small amount such as from zero up to about 5% by weight of an epoxy resin. Any of the epoxy resins mentioned heretofore in this specification can be utilized. Specific examples of epoxy resins which may be included in the primer coating compositions include Epon 1007, Epon 1001, Epon 828, etc.

Phosphoric acid or an alkylated phosphoric acid also may be included in the primer coating compositions. When utilized, the phosphoric acid or alkylated phosphoric acid concentration will be from about 0.1 to about 2% by weight based on the weight of the total composition.

In one embodiment, the constituents and the concentration of the various constituents in a non-weldable liquid primer coating composition is as follows:

| Constituents | Concentration (wt. %) |
| --- | --- |
| *Polyester resin A | 10.0-28.8 |
| **Aromatic solvent B | 5.0-29.7 |
| ***Dibasic ester | 7.9-34.5 |
| Propylene glycol monomethyl ester acetate | 1.0-28.5 |
| Silica powder | 0.1-1.5 |
| Titanium dioxide | 0-25.0 |
| Strontium chromate | 0-11.0 |
| ****Acrylic flow control agent | 0.2-1.5 |
| Epoxy phosphate ester adhesion promoter | 0.1-1.0 |
| *****Epoxy resin | 0-5.0 |

-continued

| Constituents | Concentration (wt. %) |
|---|---|
| ******Blocked aliphatic polyisocyanate | 1-10 |

*Polyester resin A is a linear saturated polyester which has a molecular weight of about 14000-15000 and a hydroxyl number of about 8-10.
**Aromatic solvent B has a boiling point of typically 350-410° F.
***Dimethyl ester of adipic acid, glutaric acid and/or succinic acid or equivalent material.
****Copolymer of butyl acrylate and stearyl methacrylate or equivalent material.
*****Hexamethylene diisocyanate resin or equivalent material, said composition having a bake temperature of up to about 450° F. to provide a flexible, crack-resistant coating on steel and/or galvanized and aluminized metal substrates.

It will be understood that the polyester resin is the principal constituent of the above-described non-weldable primer coating compositions. In one preferred embodiment, the polyester resin is dissolved in a suitable combination of solvents which include an aromatic solvent, a dibasic ester and propylene glycol monomethyl ester acetate. The titanium dioxide and strontium chromate are optional but generally desired. The flow control agent, bodying agent (silica powder) and adhesion promoter are utilized to adjust certain physical characteristics of the coating and the product, and these can be substituted with equivalent materials.

The following is a specific example of the preparation of a liquid non-weldable primer composition useful in the invention.

PRIMER COMPOSITION EXAMPLE 1

A mixture of 24.6 parts of a solution of 30 parts polyester resin Dynapol L-205 in 70 parts of DBE, 6.1 part of titanium dioxide, 7.2 parts of strontium chromate, 0.2 parts of silica (Aerosil 200), 5.1 parts of DBE, 2.8 parts of aromatic solvent and 0.2 parts of an acrylic flow-modifier is prepared by sand milling. The mill is rinsed with a mixture of 4.3 parts of the polyester solution (30% solids) and 2 parts of aromatic solvent, and the rinse is added to the original mixture. Under agitation, there are added an additional 40 parts of the polyester solution, 3.15 parts of aromatic solvent, 1.7 parts of Epon 828, 2.15 parts of blocked aliphatic isocyanate (Mobay 3175) and 0.5 part of the Epoxy Phosphate Example 1 product. Agitation of the mixture is continued and 0.1 part of 85% phosphoric acid and 0.2 part of dibutyl tin dilaurate are added. If necessary, the viscosity can be adjusted with DBE.

The above-described non-weldable liquid primer coating compositions are useful as primer coatings on metal substrates which have previously been coated with the basecoat compositions of the present invention.

The present invention also relates to the use of weldable liquid primer coating compositions over the basecoat compositions of the present invention which have been described previously. The components of the weldable liquid primer coating compositions of the present invention may be essentially the same as those utilized in the non-weldable liquid primer coating compositions such as described above although generally in different amounts and with the exception that the weldable compositions contain zinc powder and/or ferro alloy powders. The zinc powder and the ferro alloy powders utilized in the primer coating compositions are the same types as used in the basecoat compositions of the invention described earlier. Generally, the weldable liquid primer coating compositions also differ from the non-weldable primer coating compositions and the relative amounts of the various constituents. Thus, improved weldable liquid primer coating compositions useful in the present invention generally comprise:
(A) from about 3 to about 20% by weight of at least one thermoplastic resin,
(B) from about 5 to about 60% by weight of at least one organic solvent,
(C) from about 30 to about 70% by weight of zinc powder,
(D) from about 0.5 to about 10% by weight of a cross-linking agent for the thermoplastic resin,
(E) from about 0.1 to about 2% by weight of silica powder,
(F) from about 0.5 to about 2% by weight of an organic liquid lubricant, and
(G) from about 1 to about 80% by weight based on the weight of zinc powder (C), of di-iron phosphide.

In one embodiment, phosphoric acid or an alkylated phosphoric acid is included in the weldable compositions, and amounts of from about 0.5 to about 3% of phosphoric acid are often beneficial. In one embodiment, the improved weldable liquid primer coating compositions of the present invention which are useful for application to metallic substrates comprise:

| Constituents | Concentration (wt. %) |
|---|---|
| Polyester resin A | 4.0-14.9 |
| Propylene glycol monomethyl ester acetate | 2.1-11.3 |
| Aromatic solvent B | 0-18.6 |
| Dibasic ester C | 5.0-18.6 |
| Blocked aliphatic polyisocyanate | 0.0-10.0 |
| Silica powder | 0.1-1.0 |
| Zinc powder | 42.8-61.7 |
| Liquid organic lubricant | 0.5-1.5 | said compositions having a bake temperature of up to about 450° F. and even up to about 500° F. to provide a flexible crack-resistant coating on steel and on galvanized and aluminized metal substrates.

The following are specific examples of the preparation of liquid weldable primer compositions which are useful as primer compositions over the basecoats of the present invention.

PRIMER COMPOSITION EXAMPLE 2

A mixture of 26 parts of Polyester Resin of Example 2, 4 parts of Polyester Resin Example 1, 35 parts of DBE solvent and 35 parts of an aromatic solvent (Amsco G) is prepared. To 27 parts of this mixture contained in a mixing vessel, the following components are added with stirring: 0.80 part of Epon 828, 2.00 parts of a blocked aliphatic diisocyanate (Mobay 3175), 9 parts of DBE solvent, 0.20 part of silica (Aerosil 200). 40.0 parts of No. 64 zinc dust, and 15.0 parts of ferro phosphorus ($Fe_2P$). After all the components have been thoroughly mixed, 1 part of hexamethoxy methyl melamine and 0.2 part of a morpholine salt of paratoluene sulfonic acid are added. After these materials are dispersed, a mixture containing 2 parts of butanol and 0.5 parts of 85% phosphoric acid is added with agitation. If necessary, the viscosity can be adjusted by the addition of small amounts of DBE solvent.

PRIMER COMPOSITION EXAMPLE 3

To 27 parts of the initially prepared resin solvent mixture described in Primer Composition Example 2, the following components are added with agitation: 0.80 part of Epon 828, 2.0 parts of the blocked aliphatic diisocyanate, 9 parts of DBE solvent, 0.2 part of Aerosil 200, and 55 parts of ferro phosphorus. When all of these ingredients are thoroughly mixed, 1 part of hexamethoxy methyl melamine and 0.2 part of the morpholine salt of paratoluene sulfonic acid are added with agitation. Finally, a mixture of 2 parts of butanol and 0.5 part of 85% phosphoric acid is added with stirring and the viscosity is adjusted, if necessary, with additional DBE solvent.

The primer coating compositions can be applied to metal substrates by any technique known in the art including, for example, dipping, spraying, roller coating and bar coating. The primer coating compositions of the present invention are applied to the metallic substrate to provide a film which when dried and cured will result in a film thickness of about 0.1 to about 1.2 mils, generally about 0.1–0.5 mil. When the primer coating composition is applied over the basecoat composition of the present invention, the basecoat composition is dried prior to the application of the primer coat, and after the primer coat is applied, it is dried and baked at a peak metal temperature of from about 150° F. to about 500° F., and more generally from about 390° F. to about 500° F. to provide the desired corrosion-resistant coating.

When a weldable coated metal is desired, then both the basecoat and the primer coat may be of the weldable type. That is, the coating compositions used to deposit both the basecoat and the primer coat will contain zinc powder and/or a ferro alloy. The lower bake temperatures can be utilized effectively by adding catalysts such as dibutyl tin dilaurate to the primer composition.

The beneficial results obtained when a basecoat of the present invention is applied to cold rolled steel followed by the application of a weldable primer coating in accordance with the present invention are demonstrated in the following experiment. A basecoat is deposited from an aqueous composition comprising 11.7 parts of Epoxy Resin 3045, 1.5 parts of chromium trioxide, 0.8 parts of 85% phosphoric acid, 6.2 parts of zinc and 79.8 parts of water. The basecoat is applied to the cold rolled steel in a normal manner and then subjected to a bake at a peak metal temperature of either 350°, 420° or 450° F. as indicated in the following Table V. The basecoat dry film thickness is 0.10 mil. Over this basecoat is applied a primer coating composition comprising 30% by weight of organic solvent, 9.2% by weight Polyester Example 2, 1.5% by weight of blocked isocyanate curing agent, 0.6% by weight silica, 57.8% by weight zinc and 0.9% by weight of an organic lubricant. This topcoat also is applied in a normal manner and subjected to a bake at peak metal temperatures of 350° F., 420° F. or 450° F. as indicated in the following Table V. The topcoat film thickness is 0.50 mil.

Some of the panels treated and coated in accordance with the above procedure are subjected to the ASTM Salt Spray Test and the other coated panels are subjected to a detergent solution test.

In the detergent solution test, a solution containing 1.0% by weight of dry standard detergent is prepared and heated to 165° F. The panels, containing a scribe (a large "X" mark about 4 inches) and a 0.3 Olsen button are suspended in the detergent solution at 165° F. so that the "X" mark and the button are totally immersed in the solution and the time to failure in hours is observed and recorded. The hours to fail for these panels in the salt spray and the detergent solution tests are summarized in the following Table V.

TABLE V

Basecoat and Primer Coated Steel Panels

| | | | Salt Spray Hrs. to Failure | | |
|---|---|---|---|---|---|
| Test No. | Basecoat Bake °F. | Topcoat Bake °F. | Scribe | Field | 0.3 Olsen Button |
| 1 | 350 | 350 | — | — | — |
| 2 | 350 | 350 | 100 | 100 | 100 |
| 3 | 350 | 420 | — | — | — |
| 4 | 350 | 420 | 240 | 240 | 240 |
| 5 | 350 | 450 | — | — | — |
| 6 | 350 | 450 | 200 | 240 | 240 |
| 7 | 420 | 350 | — | — | — |
| 8 | 420 | 350 | 100 | 100 | 100 |
| 9 | 420 | 420 | — | — | — |
| 10 | 420 | 420 | 240 | 240 | 240 |
| 11 | 420 | 450 | — | — | — |
| 12 | 420 | 450 | 200 | 240 | 240 |
| 13 | 450 | 350 | — | — | — |
| 14 | 450 | 350 | 100 | 100 | 100 |
| 15 | 450 | 420 | — | — | — |
| 16 | 450 | 420 | 240 | 240 | 240 |
| 17 | 450 | 450 | — | — | — |
| 18 | 450 | 450 | 200 | 240 | 240 |

| | | | 1.0% Detergent at 165° F. Hrs. to Failure | | |
|---|---|---|---|---|---|
| Test No. | Basecoat Bake °F. | Topcoat Bake °F. | Scribe | Field | 0.3 Olsen Button |
| 1 | 350 | 350 | 168 | 100 | 168 |
| 2 | 350 | 350 | — | — | — |
| 3 | 350 | 420 | 168 | 168 | 168 |
| 4 | 350 | 420 | — | — | — |
| 5 | 350 | 450 | 168 | 100 | 168 |
| 6 | 350 | 450 | — | — | — |
| 7 | 420 | 350 | 168 | 100 | 168 |
| 8 | 420 | 350 | — | — | — |
| 9 | 420 | 420 | 168 | 168 | 168 |
| 10 | 420 | 420 | — | — | — |
| 11 | 420 | 450 | 168 | 168 | 168 |
| 12 | 420 | 450 | — | — | — |
| 13 | 450 | 350 | 168 | 168 | 168 |
| 14 | 450 | 350 | — | — | — |
| 15 | 450 | 420 | 168 | 168 | 168 |
| 16 | 450 | 420 | — | — | — |
| 17 | 450 | 450 | 168 | 168 | 168 |
| 18 | 450 | 450 | — | — | — |

Weldability tests (face-to-face and face-to-back) are conducted on samples of coated metal in the odd-numbered tests, and all of the panels are weldable.

The results summarized in Table V demonstrate that over the peak metal bake temperature range of 350°–450° F. for the basecoat and the weldable topcoat, the two-coat system has a high resistance to salt spray and to hot detergent solutions. Best results are obtained when the peak metal bake temperature of the topcoat is 420° F. or more.

The primer coat is applied to deposit a dry film thickness of about 0.2 to 0.8 mil and more generally from about 0.4 to 0.6 mil. The metal substrates coated in accordance with the procedures and with the compositions of this invention can be readily and satisfactorily overcoated or topcoated with commercial high performance coatings such as appliance coatings and automotive coatings. When the coatings deposited in accordance with this invention containing zinc or are otherwise electrically conductive, the coatings can be overcoated with an electrocoat for substantial corrosion-resistance.

While the invention has been explained in relation to its preferred embodiments, it is to be understood that various modifications thereof will become apparent to those skilled in the art upon reading the specification.

Therefore, it is to be understood that the invention disclosed herein is intended to cover such modifications as fall within the scope of the appended claims.

We claim:

1. An aqueous composition comprising:
   (A) an organic resin component consisting essentially of at least one water-dispersible or emulsifiable epoxy resin or a mixture of resins containing more than 50% by weight of at least one water-dispersable or emulsifiable epoxy resin wherein the epoxy resins are the product of the condensation reaction of an epihalohydrin and an aliphatic or aromatic polyhydroxy compound, or a polycarboxylic acid,
   (B) chromium trioxide in an amount to provide at least about 12 parts by weight of hexavalent chromium metal per 100 parts by weight of solid resin (A), and
   (C) at least about 25% by weight of water, said composition further characterized as being substantially free of strontium chromate.

2. The composition of claim 1 also containing (D) phosphoric acid or an alkyl phosphoric acid.

3. The composition of claim 1 wherein the resin component (A) is a mixture of an epoxy resin and at least one halogen-containing thermoplastic polymer.

4. The composition of claim 3 wherein the halogen-containing thermoplastic polymer is a fluorine-containing vinyl polymer.

5. The composition of claim 1 also containing (E) zinc powder, a ferro alloy or mixtures thereof.

6. An aqueous composition comprising:
   (A) from about 2 to about 25% by weight of an organic resin component consisting essentially of at least one water-dispersible or emulsifiable epoxy resin or a mixture of resins containing more than 50% by weight of at least one water-dispersible or emulsifiable epoxy resin wherein the epoxy resins are the product of the condensation reaction of an epihalohydrin and an aliphatic or aromatic polyhydroxy compound, or a polycarboxylic acid,
   (B) chromium trioxide in an amount to provide at least about 12 parts by weight of hexavalent chromium metal per 100 parts by weight of solid resin (A), and
   (C) from about 25 to about 97% by weight of water, said composition further characterized as being substantially free of strontium chromate.

7. The composition of claim 6 also containing (D) from about 0.5 to about 5% by weight of phosphoric acid or an alkyl phosphoric acid.

8. The composition of claim 6 wherein the resin component (A) is a mixture of an epoxy resin and at least one halogen-containing thermoplastic polymer.

9. The composition of claim 6 wherein the resin component (A) is a mixture of an epoxy resin and at least one thermoplastic polyester resin.

10. The composition of claim 6 wherein the epoxy resin has an epoxide equivalent weight of from about 150 to about 10,000.

11. The composition of claim 6 wherein the epoxy resin (A) has an epoxide equivalent weight of from about 1000 to about 3000.

12. The composition of claim 8 wherein the halogen-containing thermoplastic polymer is a fluorine-containing vinyl polymer.

13. The composition of claim 6 containing from about 10 to about 20% by weight of the epoxy resin (A) and from about 0.5 to about 1.5% by weight of chromium trioxide.

14. The composition of claim 6 also containing from about 5 to about 60% by weight of zinc powder or a ferro alloy powder or a mixture thereof.

15. The composition of claim 6 also containing 5 to 60% by weight of zinc powder and from about 1 to about 30% by weight, based on the weight of zinc powder, of di-iron phosphide.

16. The composition of claim 6 also containing at least one water-compatible lubricant.

17. The composition of claim 9 wherein the polyester resin is a polymer derived from at least one aromatic dicarboxylic acid and at least one glycol.

18. An aqueous composition comprising:
   (A) an organic resin component consisting essentially of at least one water-dispersible or emulsifiable epoxy resin, or a mixture of resins containing more than 50% by weight of at least one water-dispersible or emulsifiable epoxy resin, wherein the epoxy resins are the product of the condensation reaction of an epihalohydrin and an aliphatic or aromatic polyhydroxy compound, or a polycarboxylic acid,
   (B) chromium trioxide,
   (C) at least about 25% by weight of water, and
   (D) zinc powder or a ferro alloy powder or mixtures thereof.

19. The composition of claim 18 also containing (E) phosphoric acid or an alkyl phosphoric acid.

20. The composition of claim 18 also containing (F) at least one halogen-containing thermoplastic polymer.

21. The composition of claim 20 wherein the thermoplastic polymer is a fluorine containing vinyl polymer.

22. The composition of claim 18 also containing at least one thermoplastic polyester resin.

23. A water-borne liquid coating composition comprising:
   (A) from about 2 to about 25% by weight of at least one water-dispersible or emulsifiable epoxy resin or a mixture of resins containing more than 50% by weight of at least one water-dispersible or emulsifiable epoxy resin, wherein the epoxy resins are characterized as having an epoxide equivalent weight of from about 1000 to about 3000 and wherein the epoxy resins ar the product of the condensation reaction of an epihalohydrin and an aliphatic or aromatic polyhydroxy compound, or a polycarboxylic acid,
   (B) from about 0.5 to about 5% by weight of chromium trioxide,
   (C) from about 25 to about 90% by weight of water,
   (D) from about 5 to about 60% by weight of zinc powder, and
   (E) from about 0.5 to about 3% by weight of phosphoric acid or butyl phosphoric acid.

24. The coating composition of claim 23 also containing from about 0.5 to about 15% by weight of at least one fluorine-containing vinyl polymer.

25. The coating composition of claim 23 also containing from about 0.5 to about 15% by weight of a thermoplastic polyester resin.

26. A coating composition of claim 23 wherein the epoxy resin is a diglycidyl ether of a bis-phenol.

27. An improved corrosion-resistant water-borne liquid pretreating basecoat composition for metallic substrates, said composition comprising:

| Constituents | Concentration (wt. %) |
| --- | --- |
| Water-dispersible epoxy resin | 2.1–18.4 |
| Chromium trioxide powder | 0.8–4.6 |
| Phosphoric acid | 0.8–2.7 |
| Zinc powder | 6.2–51.5 |
| Water | 29.2–88.0 | wherein the epoxy resin is the product of the condensation reaction of an epihalohydrin and an aliphatic or aromatic polyhydroxy compound, or a polycarboxylic acid, said composition having a bake temperature of about 390° F. to 450° F. to provide a flexible crack-resistant coating on steel and on galvanized and aluminized metal substrates.

28. The aqueous composition of claim 1 containing up to about 130 parts by weight of hexavalent chromium metal per 100 parts by weight of solid resin (A).

29. The aqueous composition of claim 6 containing up to about 130 parts by weight of hexavalent chromium metal per 100 parts by eight of solid resin (A).

30. The aqueous composition of claim 1 wherein the epoxy resin is the product of the condensation reaction of an epihalohydrin and an aromatic polyhydroxy compound.

31. The aqueous composition of claim 30 wherein the aromatic polyhydroxy compound is a bisphenol.

32. The aqueous composition of claim 18 wherein the epoxy resin is the product of the condensation reaction of an epihalohydrin and an aromatic polyhydroxy compound.

33. The aqueous composition of claim 32 wherein the aromatic polyhydroxy compound is a bisphenol.

34. The aqueous composition of claim 23 wherein the epoxy resin is the product of the condensation reaction of an epihalohydrin and an aromatic polyhydroxy compound.

35. The aqueous composition of claim 34 wherein the aromatic polyhydroxy compound is a bisphenol.

* * * * *